United States Patent
Lotz et al.

(10) Patent No.: US 9,514,642 B2
(45) Date of Patent: Dec. 6, 2016

(54) METHOD FOR DETECTING TRAFFIC JAMS USING A WIRELESS VEHICLE TO VEHICLE COMMUNICATION SYSTEM

(71) Applicant: CONTINENTAL AUTOMOTIVE GMBH, Hannover (DE)

(72) Inventors: Andreas Lotz, Wetzlar (DE); Hongjun Pu, Solms (DE); Fa Zhang, Shanghai (CN)

(73) Assignee: Continental Automotive GmbH, Hannover (DE)

( * ) Notice: Subject to any disclaimer, the term of this patent is extended or adjusted under 35 U.S.C. 154(b) by 67 days.

(21) Appl. No.: 14/384,792

(22) PCT Filed: Mar. 6, 2013

(86) PCT No.: PCT/EP2013/054456
§ 371 (c)(1),
(2) Date: Sep. 12, 2014

(87) PCT Pub. No.: WO2013/135535
PCT Pub. Date: Sep. 19, 2013

(65) Prior Publication Data
US 2015/0032289 A1    Jan. 29, 2015

(30) Foreign Application Priority Data
Mar. 15, 2012 (DE) .................. 10 2012 204 098

(51) Int. Cl.
*G05D 1/00*    (2006.01)
*G05D 3/00*    (2006.01)
(Continued)

(52) U.S. Cl.
CPC .......... *G08G 1/0125* (2013.01); *G08G 1/0112* (2013.01); *G08G 1/0133* (2013.01); *G08G 1/163* (2013.01); *H04L 67/12* (2013.01); *H04W 4/046* (2013.01)

(58) Field of Classification Search
CPC ............. G08G 1/0125; G08G 1/0133; G08G 1/0112; G08G 1/162; G08G 1/167; G08G 1/22; G08G 1/207; H04W 4/046
See application file for complete search history.

(56) References Cited

U.S. PATENT DOCUMENTS

| | | | |
|---|---|---|---|
| 6,198,427 B1 * | 3/2001 | Aker | G01S 7/04 342/104 |
| 6,299,102 B2 * | 10/2001 | Happ | 244/122 AG |

(Continued)

FOREIGN PATENT DOCUMENTS

| | | |
|---|---|---|
| DE | 10 2005 046841 | 4/2007 |
| DE | 1020050500277 | 4/2007 |

(Continued)

OTHER PUBLICATIONS

Bauza et al., "Road Traffic Congestion Detection through Cooperative Vehicle-to-Vehicle Communications", 2010, pp. 606-612.

(Continued)

*Primary Examiner* — Adam Tissot
*Assistant Examiner* — Tommy Worden
(74) *Attorney, Agent, or Firm* — Cozen O'Connor

(57) ABSTRACT

A method for queue recognition by wireless vehicle to vehicle communication includes: checking a relevance for surrounding vehicles from which an ego vehicle receives messages by a comparison with relevance criteria and establishing a relevance if the relevance criteria are satisfied; selecting the speed and position values that are associated with relevant surrounding vehicles and have the speed values indicating a same direction of travel as the ego vehicle; defining a first virtual vehicle to which mean values of selected speed and position values are allocated as values for the at least one first virtual vehicle; recording a time profile of the speed and position values of the at least one first virtual vehicle; recording, as a change value, the time profile of changes in the speed and position values of the first virtual vehicle; and comparing the change value with a queue criterion.

9 Claims, 2 Drawing Sheets

(51) Int. Cl.
*G06F 7/00* (2006.01)
*G06F 17/00* (2006.01)
*G08G 1/01* (2006.01)
*G08G 1/16* (2006.01)
*H04W 4/04* (2009.01)
*H04L 29/08* (2006.01)

(56) References Cited

U.S. PATENT DOCUMENTS

| | | | |
|---|---|---|---|
| 8,229,644 B2 | 7/2012 | Boecker et al. | |
| 8,280,583 B2 | 10/2012 | Stählin et al. | |
| 8,825,266 B2 * | 9/2014 | Naderhirn | G05D 1/0202 342/109 |
| 2001/0039472 A1 * | 11/2001 | Isogai | B60K 31/0008 701/96 |
| 2007/0027610 A1 | 2/2007 | Parikh et al. | |
| 2008/0065311 A1 * | 3/2008 | Bauchot | G08G 1/0104 701/117 |

FOREIGN PATENT DOCUMENTS

| | | |
|---|---|---|
| DE | 10 2009 052773 | 4/2011 |
| DE | 10 2009 047097 | 5/2011 |
| DE | 10 2010 028880 | 5/2011 |
| DE | 10 2010 007262 | 8/2011 |
| EP | 1 895 485 | 3/2008 |
| WO | WO 2009074655 | 6/2009 |
| WO | WO 2010028626 | 3/2010 |

OTHER PUBLICATIONS

Terroso-Sáenz et al., "A Cooperative Approach to Traffic Congestion Detection with Complex Event Processing and VANET", 2012, pp. 1-16.

Vaqar et al., "Traffic Pattern Detection in a Partially Deployed Vehicular Ad Hoc Network of Vehicles", Dec. 3, 2009, pp. 40-46.

Lakas, A., "Detection and Dissipation of Road Traffic Congestion Using Vehicular Communication", 2009, 6 pages.

* cited by examiner

METHOD FOR DETECTING TRAFFIC JAMS USING A WIRELESS VEHICLE TO VEHICLE COMMUNICATION SYSTEM

CROSS-REFERENCE TO RELATED APPLICATIONS

This is a U.S. national stage of application No. PCT/EP2013/054456, filed on 6 Mar. 2013, which claims priority to the German Application No. DE 102012204098.6 filed 15 Mar. 2012, the content of both incorporated herein by reference.

BACKGROUND OF THE INVENTION

1. Field of the Invention

The invention relates to a method for queue recognition by means wireless vehicle-to-vehicle communication, in which an ego vehicle, in which the method for queue recognition is performed, receives speed and position values from surrounding vehicles situated in the reception area of the vehicle-to-vehicle communication.

The vehicle-to-vehicle communication is part of the vehicle-to-surroundings communication. In this case, a vehicle interchanges information with its surroundings by sending and receiving messages. The messages usually also relate to vehicle-specific values that are recorded by sensors, for example, or obtained in another way, in a single vehicle prior to sending and are then stored. In general, the messages can therefore particularly also contain any type of information or values that characterize the vehicle state. By way of example, they may be speed and position values, but also other values or information that is/are specific to a driving situation, such as the steering, or else values that are not specific to a driving situation and relate to other properties of the vehicle, such as the vehicle type.

2. Related Art

On the basis of the present level of development, vehicle-to-vehicle communication has provision for the determined values and information to be compiled in a standardized method and conditioned in a likewise standardized message. By way of example, the underlying standard is the ITS standard. In this case, ITS is the abbreviation for the term "Intelligent Transportation System". The effect achieved by this is that the messages can be received universally, that is to say including by other vehicles, for example regardless of the type of manufacturer.

In addition, the ITS standard has provision for these messages to be transmitted either continuously, i.e., at defined intervals of time of greater or lesser length, or on the basis of an event. The continuous messages are also referred to as "Cooperative Awareness Messages", or CAM messages for short, in the ITS standard. The CAM messages are transmitted omnidirectionally and periodically, that is to say in a similar manner to a beacon, by one vehicle and can be received by any appropriately configured other vehicle in the reception area.

The messages are transmitted using various wireless communication paths. By default, the ITS standard has provision for the messages to be interchanged on a WLAN-based radio channel. However, it is also possible to use other radio channels, particularly for sending the messages. By way of example, WO 2009/074655 A1 discloses a method that involves the use of a further radio channel for sending particularly relevant messages. The additional radio channel is a radio channel that is used for a wireless access and authorization system.

In addition, the vehicle-to-vehicle communication has provision for particular messages to be transmitted on the basis of an event that has occurred. These messages are known as DENM ("Decentralized Environmental Notification Messages"). On the basis of the ITS standard, such messages are transmitted in the case of a suddenly occurring event, such as an accident. Thus, vehicles that are in the surroundings of the vehicle transmitting the DENM messages, i.e., in the reception area around this vehicle, can be warned of this event. By way of example, the DENM messages allow vehicles to be informed about an accident that has taken place in front of them, for example.

However, the transmission of a DENM message frequently requires the occurrence of a sudden, temporally and spatially unforeseeable event. There are traffic situations in which a critical situation arises as a result of continuous alteration of the situation of a vehicle or a group of vehicles, however. Thus, the flow of traffic on a road can change merely as a result of the number of vehicles on this road, for example. Accordingly, critical situations can arise without a preceding sudden event, including without a DENM message being transmitted. Furthermore, the transmission of a DENM message for a queue end presupposes that the vehicle is already in the queue or has already recognized the queue.

In addition, situations may also arise in which the flow of traffic is altered by virtue of road users who are not participating in the vehicle-to-vehicle communication participating in the vehicle scenario and influencing it. These may be pedestrians or other vehicles that are not equipped with an appropriate communication system, for example. Thus, in city traffic or on highways, it is a frequent occurrence that the volume of traffic continually increases and thus slow-moving traffic or a queue arises. These traffic situations are distinguished by a usually significantly reduced average speed of the vehicles. In the case of a queue, the vehicles may come to a complete standstill, in which the speed of the vehicles is zero. In the case of such a continual alteration in the flow of traffic, there is no sudden critical event that would warn the subsequent traffic. In particular, the gradual slowing of the flow of traffic means that a DENM message is not transmitted or at least is transmitted belatedly.

However, it is desirable for the driver of a vehicle to be informed early about such an alteration, precisely because one of the most frequent causes of an accident in road traffic is the occurrence of a queue and in that case particularly the queue end. The queue end is the link between normally moving traffic, moving at the recommended maximum speed on highways, for example, and the queue, i.e., in extreme cases stationary vehicles. Hence, the speed differences in the vehicles are great in the region of the queue end. This results in a significantly increased probability of an accident. This can be exacerbated by geographical circumstances, such as a complicated and confusing road profile, poor visibility conditions, the weather in general or high speeds of the vehicles in normally moving traffic before the end of the queue.

At present, there are already various opportunities for warning the drivers of a vehicle about a queue or queue end. These can be coarsely divided into two systems. In the first system, an attempt is made to distribute the volume of traffic evenly over the roads. They therefore aim at informing the driver as early as possible. The second systems have the aim of actively intervening in the driving scenario. The objective in this case is to avoid an accident or at least to reduce the consequences of an accident.

By way of example, one way of providing early information for the driver involves informing him about an impending queue by alternating signage or information gantries. These may be installed at the edge of the road and may possibly also recommended alternative routes. These warn the driver about the queue so early that he is able to adapt his journey route accordingly. By way of example, he can take the next exit on a highway and use a country road instead. Such traffic control systems monitor the traffic either by sensors in or on the road, or the traffic is observed manually. Therefore, the installation and/or operation are costly and involved. This results in the systems usually being limited to areas of high population density and, even in those areas, monitoring the traffic usually only on a coarse-meshed basis.

Early warning is likewise the aim of conventional traffic announcements on the radio. Although the announcements are available over a wide area, they allow the driver only coarse orientation. In the meantime, data are also being transmitted over radio frequencies, for example the RDS ("Radio Data System") service, in addition to the traffic announcements. In recent years, the prevalence and availability of such traffic information have been significantly improved. In some cases, the traffic information is thus linked directly to vehicle-internal navigation systems via TMC ("Traffic Message Channel"). This allows a level of spatial and temporal precision to be achieved that enables the driver, independently or using the navigation system, to find an improved route. However, the success is wholly dependent on the quality of the traffic information received. The temporal and spatial precision is frequently insufficient for active intervention in the driving scenario, however.

Driver assistance systems can influence the driving situation of the vehicle. To this end, the surroundings are monitored by vehicle-inherent sensors, for example. The driver assistance systems therefore work autonomously. When the driver assistance system recognizes a critical traffic situation, it either warns the driver visually and/or audibly and recommends that a braking process be initiated, for example. In the meantime, some systems also allow direct intervention in the driving scenario, for example by virtue of the initiation of an automatic braking process. The sensors used, such as radar or lidar, are long range, in principle, but separation effects can arise. This means that although a distant vehicle can be recorded on the open road, it is sometimes not, or not completely, recorded when there is a further object inbetween. Similarly, a vehicle that is behind a summit cannot be recorded. Therefore, the range is at least restricted in road traffic. In dense traffic, the range may thus also be limited to the immediately adjacent vehicle. Such driver assistance systems are expensive and warn the driver only about a sudden hazard. They reach their limits in dense traffic, however.

SUMMARY OF THE INVENTION

It is therefore an object of the present invention to provide a method for early recognition of a queue in a vehicle that is distinguished by improved (in particular spatial and temporal) precision.

This object is achieved with a method for queue recognition by wireless vehicle-to-vehicle communication. The method is performed in an ego vehicle, or in the controller of the ego vehicle that is provided therefor. To this end, speed and position values from surrounding vehicles that are in reception range of the vehicle-to-vehicle communication and transmit their speed and position values preferably continuously, i.e., on an ongoing basis at particular set or adjustable intervals of time, are continuously received by the ego vehicle preferably in the same way. The continuously transmitted and received values are composed in accordance with CAM messages defined in the ITS standard, for example. A vehicle uses these standard messages to transmit its dynamic data, such as particularly position, speed and direction of travel ("Heading").

The inventive method is divided into a plurality of method steps.

First of all, the relevance of the surrounding vehicles from which the ego vehicle (A) receives messages is established. In general, this is done by comparing data from the surrounding vehicle with prescribed relevance criteria, a vehicle for which prescribed relevance criteria are satisfied being classified as relevant. By way of example, one possible relevance criterion may be the definition of a relevance area, with the association between the surrounding vehicle and the relevance area being checked.

By way of example, a relevance area can be defined in the direction of travel in front of the ego vehicle. In that case, the relevance area extends over a region that is preferably much greater than the range of vision of the driver of the ego vehicle. This is advantageous particularly when the range of vision of the driver is significantly restricted, for example on account of geographical circumstances, as is the case in curvy or mountainous regions, for example. The size of the relevance area is technically limited by the range of the transmitted messages, which is in turn limited by the technology used. According to the invention, the shape of the relevance area can also be adapted on the basis of the road profile. As a geometrically simple shape, the relevance area may have the shape of a quadrangle, for example, particularly on a straight road.

In the case of a complex road topology, it is frequently so that not every surrounding vehicle has a potential influence on the ego vehicle. Fine verification of the relevance of a sending surrounding vehicle to the ego vehicle can be performed very effectively using the methods presented in DE 10 2010 007 262 A1.

In the description below, the term "relevance area" is therefore understood to mean a region of the road network that satisfies the relevance criteria of the relevance check. In the relevance area, the behavior of each surrounding vehicle can have a potential influence on the ego vehicle. The relevance area may, but does not need to, be prescribeable or prescribed by an area selection.

The messages received are used in the next step to select the speed and position values, associated with the surrounding vehicles, from which the position values are in the relevance area (i.e., only the position and speed values of the relevant surrounding vehicles are taken into consideration) and from which the speed values point in a direction of travel that is the same as that of the ego vehicle. To this end, there is provision or a need for the speed values to be available as directional information. By way of example, this is what a CAM message is, containing both the speed and the heading of the sending vehicle. By way of example, this can also be achieved by virtue of the speed being sent and recorded directly as a speed vector, or by virtue of the speed being able to be presented as a speed vector in a coordinate system by means of specification of the speed components. The coordinate system may preferably be a universally used coordinate system that is also used by a satellite-based locating system, for example. In this coordinate system, the position of the vehicles can be represented by indication of the 2-tuple (L, B), comprising degrees of longitude and latitude. A standard coordinate specification with x and y values, referenced to a defined coordinate origin, is naturally also possible. If both the speed components and the coordinates of the ego vehicle are available in this one coordinate system, the speed can simply be represented as a vector. In this case, the speed components may either be available as absolute values or specified relative to the ego vehicle. Advantageously, the ego vehicle is regarded or defined as the center or the origin of the coordinate system. In this case, the ego vehicle is assigned the coordinates L=0, B=0 or x=0, y=0. Similarly, the coordinates of the surrounding vehicles are accordingly, if they are available as absolute values, presented relative to the ego vehicle.

In addition, the ego vehicle is allocated its current speed and position values, i.e., these speed and position values are recorded in the course of the method, so that they are available. These values are available in most vehicles anyway as retrievable data within a vehicle communication system.

In the next method step, at least one first virtual vehicle is defined, to which the mean values of a portion of the, or all, the selected speed and position values are allocated as speed and position values of the virtual vehicle. A first virtual vehicle may thus represent a portion of the, or all, the surrounding vehicles situated in the relevance area, at least in respect of the position and speed thereof.

In a further method step, the time profiles of the speed and position values of the virtual vehicle are recorded. By way of example, it is thus possible for the speed and position values at various times to be recorded and at least temporarily stored for the first virtual vehicle, for a virtual vehicle or for a plurality of or all the virtual vehicles. Similarly, it is also possible for the speed and position values for the ego vehicle to have their time profile stored at least temporarily. In addition, the position and speed values can also be stored just for a prescribed number of instants. Preferably, the values are stored for at least three different instants.

In the next step, the time profile of the changes in the speed and position values of the virtual vehicle or a plurality of or all the virtual vehicles is recorded as at least one change value, particularly by comparing particular values at various instants. In this case, the changes can be recorded absolutely or relative to one another or else relative to the ego vehicle. In addition, provision may be made for the recorded speed and position values to be processed directly without buffer-storage and only the change values ascertained in this method step to be stored instead of the actual speed and position values. The recording and further processing of just the change value reduces both the memory requirement and the requirement in terms of the bandwidth of the transmission and is likewise more economical in terms of computation. There may possibly also be provision for the time profile of the speed and position values or of the change values of the ego vehicle to be recorded.

The ascertained change values can subsequently be compared with at least one prescribed queue criterion, with a queue warning being able to be produced as the result of the comparison when a queue has been recognized.

This method allows the early recognition of a queue in the surroundings of an ego vehicle. The recording of messages that are transmitted by vehicles in the direct surroundings of the ego vehicle achieves a high level of temporal and spatial precision. The comparatively long range of the vehicle-to-vehicle communication in comparison with the sensor recording range of known driver assistance systems allows the driver of the ego vehicle to be warned about a queue before the ego vehicle finds itself in the queue or enters the hazard region before the queue end. Similarly, the method can warn about a queue that is still in the initial stages of its formation and is merely indicated by the collective behavior of the surrounding vehicles. Similarly, this allows the information about the recognized queue to be quickly disseminated in order to warn subsequent vehicles about the queue. This can be done by transmitting a DENM message, for example.

In a further development of this concept, the invention allows provision for all the selected speed and position values to be recorded in one virtual vehicle denoted as the first. This means that the relevance area that stretches ahead of the vehicle is depicted by just one virtual vehicle. This method is a method that is particularly economical in terms of computation but is also coarse for establishing a possible queue.

To refine this method, provision may be made for a subselection of the selected speed and position values to be recorded in another virtual vehicle, referred to as the second, for which purpose particularly a prescribed number of those speed and position values in which the position values have the greatest distance to the ego vehicle is used. This method is preferably used when the total number of selected surrounding vehicles and the speed and position values thereof is greater than a prescribed total number, for example more than five surrounding vehicles. The second virtual vehicle, which is a subselection of the vehicles preferably at the outer edge of the relevance area, which edge is remote from the ego vehicle, provides a pseudo sensor that significantly extends the "field of vision" of the ego vehicle. In addition, the effect achieved by the combination of a prescribed and therefore also limited number of vehicles is that the speed and position values that are allocated to the second virtual vehicle have a higher probability of providing a more accurate depiction of the actually present vehicle situation of an individual surrounding vehicle. At the same time, however, this also achieves a statistic that at least partially compensates for any erroneous data. By way of example, the vehicles that are combined in this way to form a second virtual vehicle may be a subselection of three vehicles.

On the basis of experience, the two virtual vehicles described previously allow the flow of traffic in the relevance area to be depicted clearly and with a high level of accuracy for queue recognition.

In a further development of this method, provision may be made for the distance to the ego vehicle to be determined from the position value of the ego vehicle and the position value of a surrounding vehicle, particularly of a surrounding vehicle in the relevance area of the ego vehicle. The distance ascertained in this manner is then used to sort and store the speed and position values of the surrounding vehicles in a table according to increasing or decreasing distance. The formation of a table sorted in this manner presents the surrounding vehicles clearly and prepares them for further processing. The start and end of the table accordingly have the vehicles that are furthest away from the ego vehicle and for which a queue in the direction of travel of the ego vehicle is therefore shown at the earliest in the position and speed values. The table can be used to store not only the distance but also, by way of example, the position and speed values and also the time profile thereof. Hence, the table allows rapid and simple access to vehicles that are particularly relevant to the prediction of a queue in the near future. According to the invention, such a table also simplifies the definition of the envisaged at least one virtual vehicle or the plurality of virtual vehicles.

In a further development of the invention, as a possible change value, it is possible to ascertain the acceleration of a virtual vehicle. Since the acceleration corresponds to the time derivation of the speed, the invention provides particularly for the acceleration to be determined from the previously recorded time profile of the speed values. The acceleration is thus taken into account using two temporally successive speed values for a virtual vehicle taking into account the interval of time between the recording of the successive speed values. The recording of the acceleration of the relevant surrounding vehicles is an essential feature for detecting a queue. At the end of the queue, the vehicles in the normally moving traffic and those in the stationary traffic (queue) meet. At that point, their speeds match one another over a very short distance. This matching of speed inevitably becomes evident in the acceleration (or deceleration as acceleration with a negative arithmetic sign) of the vehicles, so that by ascertaining the signed acceleration it is possible to reliably establish a queue or a currently forming queue, for example by comparison with a suitably stipulated queue criterion.

In addition, the time profile of the acceleration recorded in this manner can likewise be stored in the above table. As a result, the dynamics of the acceleration of a virtual vehicle are recorded and depicted in time. This corresponds to the second derivation of the speed. This allows a dangerous situation such as a queue to be easily recorded from temporal analysis of the acceleration. According to the invention, it is thus possible to recognize an overall acceleration pattern, that is to say a braking operation that lasts for a long time, for example.

In a development of this concept, the change value "acceleration" can be compared with a threshold value that is used as a queue criterion. In particular, it is preferred for the threshold value used for the acceleration to be a value that is less than or equal to zero. Such negative acceleration accompanies a decrease in speed and is, as mentioned, also called deceleration. Deceleration therefore denotes a braking operation. Hence, this value can be used to establish whether a virtual vehicle, that is to say an agglomeration of surrounding vehicles, is in a collective braking maneuver or whether the surrounding vehicles are stationary. The use of a threshold value makes the method more robust toward errors. By way of example, this allows light braking operations, which on the basis of experience cannot be attributed to a queue, to be ignored by the queue recognition unit.

On the basis of this embodiment, it is also possible for the higher derivations of the speed to be used as a change value. The change in the acceleration over time, that is to say the second derivation of the speed, indicates dynamics in the acceleration. This allows vehicle situations in which a vehicle brakes first softly and then hard to be indicated. This is a driving behavior that can frequently be observed in sudden and unexpected situations.

On the basis of this concept, the time offset in the acceleration or the acceleration profile of the virtual vehicles can be taken into account as a further change value. This advantageous embodiment is based on the insight that the decelerations in the virtual vehicles have a similar profile, but one that is offset in time, as soon as the vehicles approach a queue. The similarity of the time profiles of the accelerations therefore stems from the fact that the vehicles pass through similar traffic situations at different times. This motivates the drivers of the vehicles to perform a comparable braking maneuver in a similar manner, but in each case with a time offset, until the respective vehicle has arrived at the queue end. This may be attributable to the occurrence of a common obstacle, inter alia. The time offset in the profiles therefore stems from the fact that surrounding vehicles, and hence the virtual vehicles as a group of surrounding vehicles, are at different positions in space. Hence, the spatial distance to the possible queue, and therefore the instant at which the deceleration starts, also varies. In this variant method, the invention allows analysis of which virtual vehicle first begins deceleration. By definition, the second virtual vehicle is further away from the ego vehicle than the first virtual vehicle. There is therefore a likelihood of a queue if the second virtual vehicle decelerates before the first virtual vehicle decelerates. As a good example, the time offset in the deceleration results from the driver of a vehicle in direct proximity to the queue recognizing the queue earlier and therefore braking earlier. Hence, the analysis of the time offset in the acceleration allows the reactions of a driver traveling ahead to be taken into account in the method. This method can be refined further by defining a plurality of virtual vehicles whose underlying surrounding vehicles each observe particular intervals of distance to the ego vehicle.

In a further development of the inventive concept, the invention allows the sum of the distances from at least one virtual vehicle, but preferably two virtual vehicles, to the ego vehicle and/or to another virtual vehicle to be formed as another or additional change value, and for the change value to be taken into account in the queue criterion. The distances of the vehicles can be ascertained from the position values that are associated with the vehicles. This means that if there is just one virtual vehicle then the sum of the distances corresponds precisely to the distance between the ego vehicle and the virtual vehicle. It is preferred if the first summand used is the top sum of the distance between the ego vehicle and the first virtual vehicle and if the second summand used is the distance between the first and the second virtual vehicle.

Preferably, in this case too, provision may also be made for the time profile of this change value, i.e., the sum of the distances, to be analyzed. If it follows from such analysis that the sum of the distances is reduced as time progresses, this can indicate a queue. This feature is based on the insight that the distances between the individual vehicles adopt a particular value on the basis of the speed, and that this value has a positive correlation to the speed. The reason for this is the speed-dependent safety distance between the vehicles, inter alia. It follows from this that the distances are long at a high speed and short at low speed. Analysis of the sum of the distances between the vehicles in the time profile may therefore be an indication of a reduced speed or of the occurrence of a queue.

In a further development of this concept, an expected queue end for a virtual vehicle can be estimated as another or additional change value and taken into account in a queue criterion. In the context of this invention, the term "queue" is understood to mean an agglomeration (group or collection) of vehicles that advances at a speed in the region of walking speed. In general, we refer to a queue when the speed is below 10 km/h for longer than one minute. It would also be possible to have a definition according to which the speed of an agglomeration of vehicles is on average no more than in the region of walking speed (less than 10 kilometers per hour). We refer to stop-go traffic when the speed is in a range from 10 km/h to 30 km/h. In the context of this invention, however, stop-go or slow-moving traffic can also be called a queue.

The end of such an agglomeration of vehicles that forms a queue can be established locally usually inaccurately, since there are constantly new vehicles joining the queue and the entire queue in most cases advances in the direction of travel. In addition, vehicles also leave the queue toward the front, for example when they have passed the event causing the queue. However, there is not always an event that causes a queue. In some cases, it may also be the case that a queue forms on account of increased volume of vehicles. By way of example, this occurs when the vehicle-holding capacity of the road is exceeded. Although the moving transition between the normal traffic and the queue end and the inherent movement of the queue means that it is not possible to define the queue end exactly, the positions of the virtual vehicles converge, on the basis of experience, into a position that can be regarded as the approximate queue end.

To calculate this queue end within the context of the invention, provision may therefore be made for a warning distance to be calculated from the acceleration of the virtual vehicle and the assumption that the virtual vehicle with this acceleration brakes to a standstill. The warning distance indicates the range from the associated position of the virtual vehicle to a possible standstill of the virtual vehicle. The expected queue end is then ascertained from the warning distance and the distance from the ego vehicle to the virtual vehicle. This expected queue end ascertained in this manner is preferably stored as an absolute position, and this facilitates the averaging when there are a plurality of possible expected queue ends. This type of calculation is a way of calculating a queue end that is economical in terms of computation. According to the invention, provision may be made for the expected queue end to be calculated for all virtual vehicles and/or surrounding vehicles. The calculation of the queue end becomes even more accurate when the queue end for the virtual vehicles is recorded and analyzed at different times. This preferably continuous calculation of the queue end for each time interval means that the estimated queue end can be expected to converge gradually on the actual queue end. The reason for this may be that the braking behavior of a vehicle approaching a queue delivers more reliable information for the queue end estimate as the distance to the queue end decreases. In addition, the continuous calculation allows a dynamic shift in the exact queue end to be taken into account too. Such a shift in the queue end occurs when a queue builds up in the backward direction as well as when a queue breaks up in the forward direction, for example.

Preferably, the queue end positions calculated in this manner are stored as absolute values. This facilitates time-based consideration. In particular, it is thus a simple matter to analyze the queue end for convergence over time.

Preferably, provision may be made for all the change values, that is to say the speed decrease of the virtual vehicles, the analysis of the sum of the distances between the virtual vehicles and the ego vehicle and the calculation of the queue end, to be taken into account as different or combined queue criteria. As soon as all the selected or a defined selection of particular queue criteria are satisfied, the situation is recognized as a queue.

In a further development of the inventive method, the invention allows an accuracy with which speed and position values for the surrounding vehicles are recorded to be ascertained and this accuracy to be taken into account for ascertaining the mean values of the speed and position values assigned to the virtual vehicles. The accuracy can be ascertained by the surrounding vehicles themselves and transmitted together with the speed and position values. In addition, the accuracy can also be ascertained from the type of data capture. By way of example, the position data that are captured by a global satellite navigation system thus have a haziness.

The invention also relates to an apparatus, particularly a controller, for queue recognition in an ego vehicle. The apparatus has a communication system, preferably for wireless vehicle-to-vehicle communication, that interchanges information, such as CAM messages, with surrounding vehicles in a reception area around the ego vehicle. In addition, the apparatus has a computation unit that is set up to perform the method described previously or portions thereof. An onboard system that is set up in such a way and is therefore "intelligent" can reliably recognize the traffic situation "queue".

BRIEF DESCRIPTION OF THE DRAWINGS

Further advantages, features and opportunities for application of the present invention can be found in the description below of exemplary embodiments and the drawings. In this context, all the features described and/or shown in the figures form the subject matter of the present invention on their own or in any combination, including independently of their synopsis in the claims or the back-references therein. In the drawings:

DETAILED DESCRIPTION OF THE PRESENTLY PREFERRED EMBODIMENTS

Figure 1:
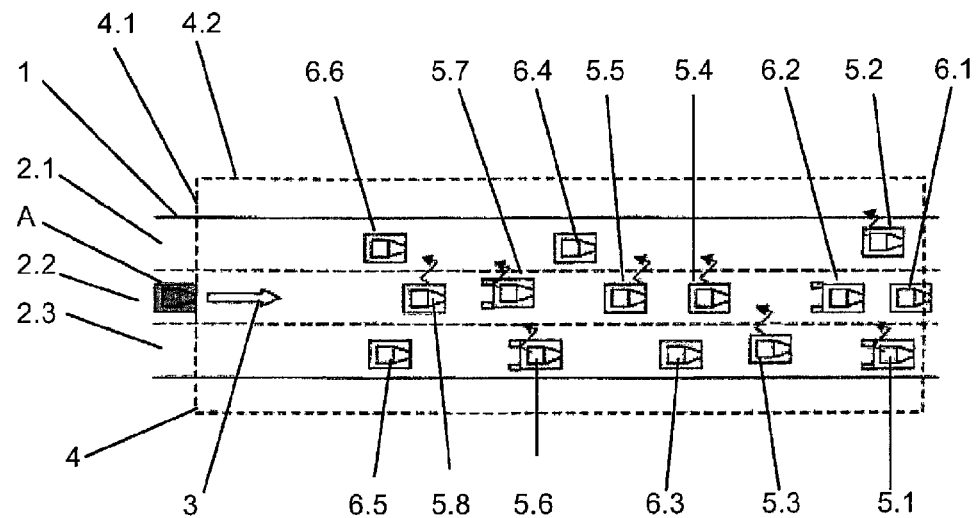
FIG. 1 schematically shows a traffic situation on a multilane road with an ego vehicle and a plurality of surrounding vehicles.

In the traffic situation shown in FIG. 1, a vehicle in which a method for queue recognition is performed, and that is subsequently called ego vehicle A, is situated on a multilane road 1 that has three traffic lanes 2.1, 2.2 and 2.3. In that case, vehicle A is moving in the middle traffic lane 2.2 in the direction of travel 3. Ahead of the ego vehicle A, there is a relevance area 4 that adopts the shape of a quadrangle in the case of the straight road shown and that contains a plurality of surrounding vehicles 5.1 to 5.8 and 6.1 to 6.6. In general, however, the relevance area is defined by virtue of relevance criteria being satisfied, without it necessarily being, in the general case, a geometric structure that can be presented in self-contained form.

In the case shown, which does not limit the invention, the relevance area has a lateral extent 4.1 and an extent 4.2 in the direction of travel. The lateral extent 4.1 of the relevance area 4 extends over the traffic lanes 2.1, 2.2 and 2.3 and also covers regions outside the traffic lanes, which means that any shoulders or median strips are also covered. The shoulder extends next to the traffic lane 2.3 and is usually called the emergency lane or breakdown lane on highways or fast roads. The median strip separates roads in opposite directions on highways or fast roads and—in the case of right-hand traffic—is situated next to the traffic lane 2.1. The inclusion of the shoulder in the relevance area 4 ensures that vehicles that are situated next to the road 1, for example, and swing onto it are likewise covered. This occurs on entry and/or exit ramps on highways or in the case of hazardous queue end situations, inter alia.

The extent 4.2 of the relevance area 4 in the direction of travel extends over a plurality of vehicle distances and is essentially limited by the reception range of the wireless vehicle-to-vehicle communication in which the ego vehicle (A) and the surrounding vehicles 5.1 to 5.8 shown take part. In the present case, the relevance area is in the form of a rectangle and has a length 4.2 of 600 m in the direction of travel and a width of 50 m laterally with respect to the direction of travel, without the invention being limited to these typical dimensions. On the basis of the geographical circumstances and the requirements for queue recognition, the relevance area will be defined differently depending on the situation and matched to the current circumstances. By way of example, the relevance area can follow the curve profile in a curve and therefore have a curved shape.

The surrounding vehicles 5.$x$ and 6.$x$ in the relevance area 4 can be divided into two classes. The first class 5.$x$ contains the vehicles 5.1 to 5.8 that take part in the wireless vehicle-to-vehicle communication. Therefore, the vehicles 5.1 to 5.8 transmit CAM messages continuously. These messages contain information about the directional speed and the position of the vehicles, inter alia.

The second class 6.$x$ contains the vehicle 6.1 to 6.6 that do not take part in the vehicle-to-vehicle communication. Thus, no direct communication takes place with the vehicles in the second class 6.$x$. Interchange of information between the vehicles in classes 5 and 6 therefore takes place indirectly at most, for example about the distance to an adjacent vehicle in the first class 5, which is recorded and transmitted by a vehicle in the first class 5. However, these vehicles 6.1 to 6.6 will usually be unable to take part in the inventive method because the necessary opportunity for communication is lacking. Therefore, these vehicles 6.1 to 6.6 are also not referred to as surrounding vehicles within the context of the invention.

Of the surrounding vehicles shown, the vehicles 5.1, 5.6, 5.7 and 6.2 have activated their hazard warning lights and are therefore indicating a hazard situation, which can now be recognized more easily by the drivers of the other vehicles.

The vehicles 6.6, 6.4 and 5.2 are in the outer traffic lane 2.1, which is closest to the median strip in the case of right-hand traffic. The vehicles 5.8, 5.7, 5.5, 5.4, 6.2 and 6.1 are situated directly in front of the ego vehicle A in the direction of travel, in the middle traffic lane 2.2. The vehicles 6.5, 5.6, 6.3, 5.3 and 5.1 are situated in the traffic lane 2.3 and hence in proximity to any emergency lane. Furthest away from the ego vehicle A, and hence at the most remote edge of the relevance area 4, are the vehicles 5.1, 5.2 and 6.1, only two vehicles 5.1 and 5.2 from which take part in the wireless vehicle-to-vehicle communication, however. The distance from the vehicles 5.1, 5.2 to the ego vehicle 1 corresponds precisely to the range of the vehicle-to-vehicle communication, for example, so that the ego vehicle A can receive CAM messages from these vehicles 5.1, 5.2.

The inventive method involves the reception of the CAM messages automatically first of all selecting the surrounding vehicles that take part in the vehicle-to-vehicle communication, that is to say that belong to class 5.$x$. A check is then performed to determine whether the vehicles are in the relevance area 4. This is accomplished using the position values that are transmitted by the CAM messages. A check is performed to determine whether the transmitted position values are within the region of the relevance area 4. If this is the case, the relevant vehicles or their speed and position values are selected and taken into account in the further method.

The position values of the surrounding vehicles are recorded as 2-tuples $P_j=(L_j(t_i), B_j(t_i))$. The index j runs from j=1, 2 ... 8 and denotes the vehicles in the first class 5.$x$. The 2-tuple $P_j$ presents the position values as degrees longitude $L_j$ and degrees latitude $B_j$ in a global navigation system at the instant $t_i$. Alternatively, another coordinate presentation is also a possibility, and in that case replaces the 2-tuples $P_j$ in the remainder of the description too. The values are known together with their measurement accuracy G. By way of example, the measurement accuracy G can be transmitted as well during transmission. In accordance with the measurement accuracy, the position accuracy is conditional upon recording of the position by a global navigation system or locating system, for example, which is fundamentally flawed. The reason for this is that the position data or the data from which the position is ascertained are subject to haziness.

Like the position values $P_j$, the speed values $V_j(t_i)$ are also transmitted together with their accuracy G. In the case of the accuracy G of the speed, an inaccuracy in the measurement in the individual vehicle is taken into account, for example.

Table 1 shows the relevant values for three vehicles from the relevance area, which contains, in general, n-vehicles, so that the values of all these n-vehicles are shown in the table.

| Vehicle No. | Speed | Accuracy of the speed | Position: degrees longitude, degrees latitude | Accuracy of the position |
|---|---|---|---|---|
| 1 | $V_1(t_1)$ | $G_1(v_1, t_1)$ | $L_1(t_1), B_1(t_1)$ | $G_1(p_1, t_1)$ |
| 2 | $V_2(t_1)$ | $G_2(v_2, t_1)$ | $L_2(t_1), B_2(t_1)$ | $G_2(p_2, t_1)$ |
| 3 | $V_3(t_1)$ | $G_3(v_3, t_1)$ | $L_3(t_1), B_3(t_1)$ | $G_3(p_3, t_1)$ |
| ... | | | | |

From the thus known position values for the surrounding vehicles 5.$x$ and the ego vehicle A, it is possible to calculate the distance $S_j$ from the surrounding vehicles 5.$x$ to the ego vehicle A at the instant $t_i$. The surrounding vehicles 5.$x$ are classified in table 2 together with the distances $S_j$ and are sorted in rising order on the basis of the distance $S_j$ to the ego vehicle A.

| Vehicle No. | Distance to the ego vehicle A |
|---|---|
| 1 | $S_1(t_1)$ |
| 2 | $S_2(t_1)$ |
| 3 | S3(t1) |
| 4 | S4(t1) |
| N | Sn(t1) |

In the next step, the surrounding vehicles 5.$x$ selected in this manner and sorted in the table 2, i.e. the vehicles 5.1 to 5.N, are allocated to virtual vehicles (B, C). The surrounding vehicles 5.$x$ at the beginning of the above table are situated at the far edge of the relevance area 4 and are therefore furthest away from the ego vehicle A. These surrounding vehicles 5.$x$ can, in principle, reach a queue or a queue end position earlier than the surrounding vehicles 5.$x$ that are situated closer to the ego vehicle A. On the one hand, to achieve good statistics, it is desirable to take into account as many surrounding vehicles 5.$x$ as possible in a virtual vehicle; on the other hand, the averaging also reduces the accuracy of prediction of a queue, since the individual values become less significant.

Therefore, only the subset of the three surrounding vehicles 5.1, 5.2 and 5.3 that are furthest away are allocated to a second virtual vehicle B. On the basis of experience, this has been found to be a good tradeoff between statistics and accuracy of prediction.

Specifically, the surrounding vehicles 5.x are allocated to a virtual vehicle B, C by forming the weighted mean value from the position values of the respectively selected surrounding vehicles 5.x. The weighting is effected with the accuracy G with which the position values are known or have been measured.

For the second virtual vehicle B, the 2-tuple ($L_B(t_i)$, $B_B(t_i)$) is ascertained individually for the degrees longitude $L_B(t_i)$ and the degrees latitude $B_B(t_i)$ using the formulae F.1 and F.2 below:

$$L_B(ti) = \frac{L_1(t_i)*G_1(p_1,t_i) + L_2(t_i)*G_2(p_2,t_i) + L_3(t_i)*G_3(p_3,t_i)}{G_1(p_1,t_i) + G_2(p_2,t_i) + G_3(p_3,t_i)} \quad (F.1)$$

$$B_B(ti) = \frac{B_1(t_i)*G_1(p_1,t_i) + B_2(t_i)*G_2(p_2,t_i) + B_3(t_i)*G_3(p_3,t_i)}{G_1(p_1,t_i) + G_2(p_2,t_i) + G_3(p_3,t_i)} \quad (F.2)$$

The approach for allocating the speed $V_B(t_i)$ of the virtual vehicle B at the instant $t_i$ is effected in a similar manner to the approach for allocating the position value. To this end, the formula F.3 below is used, which includes the speeds of the surrounding vehicles 5.1, 5.2 and 5.3 and the accuracy with which these have been ascertained:

$$V_B(ti) = \frac{V_1(t_i)*G_1(v_1,t_i) + V_2(t_i)*G_2(v_2,t_i) + V_3(t_i)*G_3(v_3,t_i)}{G_1(v_1,t_i) + G_2(v_2,t_i) + G_3(v_3,t_i)} \quad (F.3)$$

In the next step, a first virtual vehicle C is defined. This vehicle is allocated all the surrounding vehicles 5.x that take part in the vehicle-to-vehicle communication and are situated in the relevance area. Therefore, the virtual vehicle C represents all the vehicles in the class 5.x. The relevant position and speed values are shown in the table below.

| Vehicle No. | Speed | Accuracy of the speed | Position: degrees longitude, degrees latitude | Accuracy of the position |
|---|---|---|---|---|
| 1 | $V_1(t_1)$ | $G_1(v_1,t_1)$ | $L_1(t_1), B_1(t_1)$ | $G_1(p_1,t_1)$ |
| 2 | $V_2(t_1)$ | $G_2(v_2,t_1)$ | $L_2(t_1), B_2(t_1)$ | $G_2(p_2,t_1)$ |
| 3 | $V_3(t_1)$ | $G_3(v_3,t_1)$ | $L_3(t_1), B_3(t_1)$ | $G_3(p_3,t_1)$ |
| 4 | $V_4(t_1)$ | $G_4(v_4,t_1)$ | $L_4(t_1), B_3(t_1)$ | $G_4(p_4,t_1)$ |
| ... | ... | ... | ... | ... |
| n | $V_n(t_1)$ | $Gn(V_n,t_1)$ | $L_n(t_1), B_n(t_1)$ | $G_n(p_n,t_1)$ |

The allocation of the surrounding vehicles 5.1 to 5.8 to the first virtual vehicle C is effected in the manner of the allocation of the surrounding vehicles 5.1 to 5.3 to the second virtual vehicle B. Accordingly, the speed and position values of the virtual vehicle C correspond to the weighted mean of the speed and position values of all the vehicles in the first class 5. For this calculation, the formulae F.4, F.5 and F.6 are thus used in a similar manner:

$$V_c(t_i) = \frac{\sum_{x=1}^{n}(V_x(t_i)*G_x(v_x,t_i))}{\sum_{x=1}^{n}(G_x(v_x,t_i))} \quad (F.4)$$

$$L_c(t_i) = \frac{\sum_{x=1}^{n}(L_x(t_i)*G_x(p_x,t_i))}{\sum_{x=1}^{n}(G_x(p_x,t_i))} \quad (F.5)$$

$$B_c(t_i) = \frac{\sum_{x=1}^{n}(B_x(t_i)*G_x(p_x,t_i))}{\sum_{x=1}^{n}(G_x(p_x,t_i))} \quad (F.6)$$

The values of the virtual vehicles B and C created in this manner are shown together with those of the ego vehicle A in the table below. This combination of the surrounding vehicles 5.x to form two different virtual vehicles B, C has allowed the complexity of the traffic situation in the illustration to be significantly reduced. This is also evident from FIG. 2, which shows the virtual vehicles B, C ascertained above and the ego vehicle A, in comparison with FIG. 1.

TABLE 1

| Vehicle | Observations | Speed, position |
|---|---|---|
| A | Ego vehicle | $V_A(t_i), (L_A(t_i), B_A(t_i))$ |
| B | Depictions of the first 3 vehicles from table 1 | $V_B(t_i), (L_B(t_i), B_B(t_i))$ |
| C | Depictions of all the vehicles in | $V_c(t_i), (L_c(t_i), B_c(t_i))$ |

Figure 2:
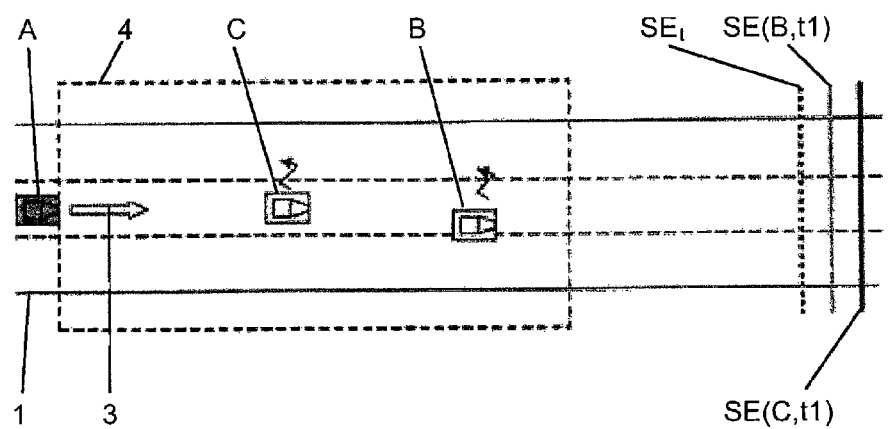
FIG. 2 schematically shows a traffic situation on a multilane road with the ego vehicle and a plurality of virtual vehicles.

FIG. 2 also shows that the position value of the virtual vehicle B is not situated in the middle traffic lane 2.2 but rather is slightly offset toward the traffic lane 2.3. The reason for this is that the vehicles 5.1 and 5.3 are in the outer traffic lane 2.3 and only the vehicle 5.2 is in the outer traffic lane 2.1.

In the next step, the speed and position values are recorded at different instants $t_i$, where i=1, 2, . . . m. The index denotes a progressive natural number. This allows the acceleration $a_x(t_i)$ to be ascertained from temporally successive speeds of the virtual vehicles x=B, C. The acceleration of a vehicle is ascertained using formula F.7 below. The calculation of the acceleration necessarily requires the speed values at two different instants.

$$a_x(t_{i+1}) = \frac{V_x(t_{i+1}) - V_x(t_i)}{(t_{i+1} - t_i)} \quad (F.7)$$

Besides the acceleration a, it is also possible to record the distance of the virtual vehicles from one another $S_{xy}$, and also the distance from the vehicles to the ego vehicle at different times.

In this case, x, y are indices that denote the vehicle. In the example described, they can thus assume the values A, B, C.

The distance $S_{xy}$ is obtained from the difference between the position values of the individual vehicles. The difference is ascertained separately for the position value of degrees longitude L and degrees latitude B. From these distances, the sum of the distances from one another is also recorded $S_{abc}(t_i)$. This takes account of the distance from the virtual vehicle C to the virtual vehicle B and to the ego vehicle A, respectively.

These data are presented at the three instants $t_1$, $t_2$ and $t_3$ in the table below.

| Instant | Acceleration | Sum of the distance | Warning distance |
| --- | --- | --- | --- |
| $t_1$ | | $S_{abc}(t_1) =$ $S_{bc}(t_1) + S_{ac}(t_1)$ | $S_{warn}(B, t_1)$, $S_{warn}(C, t_1)$ |
| t2 | $a_B(t_2), a_C(t_2)$ | $S_{abc}(t_2) =$ $S_{bc}(t_2) + S_{ac}(t_2)$ | $S_{warn}(B, t_2)$, $S_{warn}(C, t_2)$ |
| $t_3$ | $a_B(t_3), a_c(t_3)$ | $S_{abc}(t_3) =$ $S_{bc}(t_3) + S_{ac}(t_3)$ | $S_{warn}(B, t_3)$, $S_{warn}(C, t_3)$ |

In the next step, the acceleration is analyzed. As soon as the ascertained acceleration is negative, the vehicle is decelerating. If the deceleration is below a predefined, negative threshold, the absolute value of which is 2 m/s², this is rated as a braking operation for the virtual vehicle, which indicates a queue.

Assuming that the vehicle maintains this deceleration constantly, a warning distance $S_{warn}$ is calculated using formula F.8 below.

$$S_{warn} = (X, t_i) = \frac{V_x(t_i)^2}{2 * a_x(t_i)} \quad (F.8)$$

The warning distance $S_{warn}$ corresponds to the distance that the virtual vehicle X=B, C requires in order to reduce its speed $V_x$ to zero. Therefore, the warning distance $S_{warn}$ is also called a stopping distance. It is then assumed that the queue end SE is at the point at which the vehicle would stop. The warning distance $S_{warn}$ therefore indicates the current distance between the virtual vehicle B, C and the approximate queue end SE. The warning distance $S_{warn}$ is likewise included in the table above at different times $t_i$.

On the basis of the warning distance, the assumed queue end SE from the point of view of the ego vehicle A can be calculated using formulae F.9 and F.10 below. The position of the queue end SE alters as a function of the time $t_i$ and the virtual vehicle B, C on the basis of which the calculation took place.

$$SE(B,t_i)=S_{BA}(t_i)+S_{warn}(B,t_i) \quad (F.9)$$

$$SE(C,t_i)=S_{CA}(t_i)+S_{warn}(C,t_i) \quad (F.10)$$

The accuracy of the calculation of the queue end SE improves as time $t_1$ progresses. The reason for this is that as time progresses the vehicles approach the actual queue end SE and the deceleration processes of the vehicles are increasingly matched to the queue situation. This makes the queue end calculation on the basis of the deceleration of the two virtual vehicles more reliable. It can therefore also be expected that the estimation SE(B, t) will become more accurate than SE(C, t).

Figure 3:
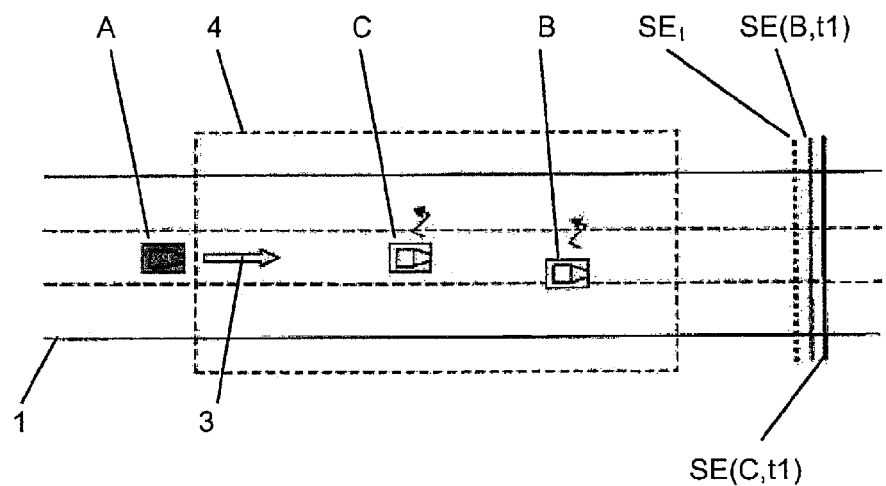
FIG. 3 schematically shows a traffic situation as in FIG. 2, but at a later instant.

FIG. 3 shows the situation shown in FIG. 2 at a later instant $t_2$. It can clearly be seen that the different expected queue ends SE(B, $t_2$) and SE(C, $t_2$) approach the actual queue end $SE_t$ in comparison with the queue ends at the instant $t_1$.

These queue ends SE(X, $t_i$) are recorded and stored at different times $t_i$ for the virtual vehicles X=B, C. Thus, the position of the queue end SE can be adjusted continuously. This allows a dynamic shift in the queue end SE to be depicted. This occurs when the queue is formed in the backward direction and when the queue breaks up in the forward direction, for example.

Figure 4:
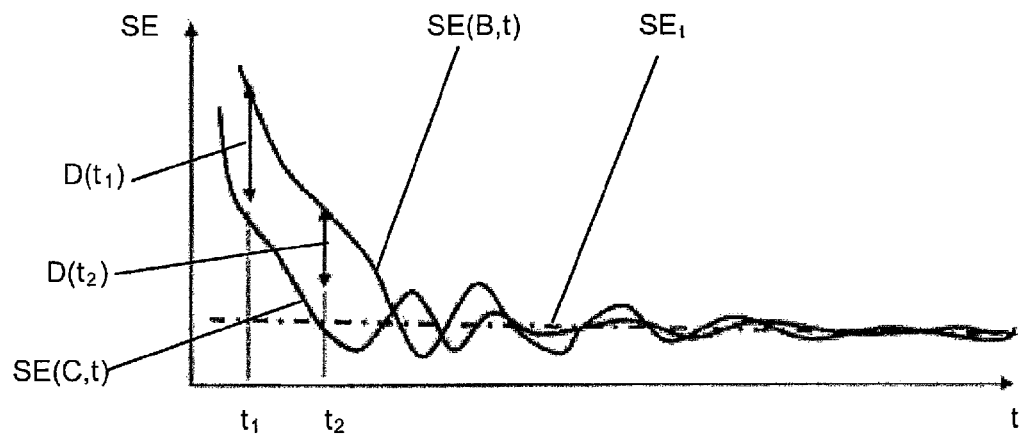
FIG. 4 shows a graph of the queue end position over time.

FIG. 4 plots the resultant graph of the assumed queue ends SE over the time $t_i$. The graph in FIG. 4 shows the distance from the virtual vehicles B, C to the assumed queue end SE.

As was already evident from FIG. 2 and FIG. 3, the assumed queue ends SE approach one another as time progresses and converge toward the actual queue end $SE_t$ if the vehicles are actually moving toward a queue. In this case, the distance between the expected queue ends SE(B, $t_i$) and SE(C, $t_i$) also converges as time $t_i$ progresses.

From the data ascertained in this manner and the temporal analysis thereof, a plurality of criteria are established that indicate a hazardous situation. Particularly when considered together, the criteria are characteristic of a queue that is forming or has formed in or shortly before the relevance area 4, however.

The first queue criterion used is the temporal analysis of the speeds. A reduction first in the speed of the vehicle B and then in the speed of vehicle C indicates a hazardous situation.

In addition, the sum of the distances $S_{abc}$ between the vehicles A, B and C is analyzed and is used as a second queue criterion. If $S_{abc}$ constantly decreases as time $t_i$ progresses, this indicates a hazardous situation.

The third queue criterion uses the convergence of the ascertained queue ends SE over time. To this end, a difference $D(t_i)$ is formed at different times between the different queue end positions SE(X), X=A, B. The time profile of the difference $D(t_i)$ allows a hazardous situation to be identified. A potential queue is manifested by virtue of the difference D converging toward zero, or becoming less than a particular threshold value, as time progresses.

The three queue criteria are summarized in table 6. As soon as all three criteria are satisfied, the situation is immediately recognized as a queue end.

| Queue criterion No. | Condition |
| --- | --- |
| 1 | $a_x(t_i) \leq 0$; i = 1, 2, 3; x = B, C |
| 2 | $S_{abc}(t_1) \geq S_{abc}(t_2) \geq S_{abc}(t_3)$ |
| 3 | SE(B, $t_i$) and SE(C, $t_i$) converge in the course of time, D→0 |

If a traffic situation exists in which just five or fewer surrounding vehicles 5.x are situated in the relevance area 4, it is possible to perform a slightly modified variation of the method described above.

In this second exemplary embodiment, in contrast to the first exemplary embodiment, a virtual vehicle B is not ascertained from the vehicles that are furthest away. On account of the small number of surrounding vehicles, the virtual vehicle B would no longer be representative of the "early queue end recognition" in time and space. The majority of the surrounding vehicles 5.x, which would be represented by two virtual vehicles B, C, would be identical. Therefore, a distinction between surrounding vehicles 5.x that are situated at the far edge of the relevance area 4 and the other surrounding vehicles 5.x in the relevance area 4 is not associated with a gain in accuracy of prediction.

The queue criteria are accordingly slightly modified. When the distances of the vehicles from one another are considered over time, only the distance from the virtual vehicle C to the ego vehicle is considered. Similarly, the queue end is calculated only using the virtual vehicle C.

| Queue criterion No. | Condition |
| --- | --- |
| 1 | $a_c(t_i) \leq 0$; $i = 1, 2, 3$ |
| 2 | $S_{ac}(t_1) \geq S_{ac}(t_2) \geq S_{ac}(t_3)$ |
| 3 | $SE(C, t_i)$ converge in the course of time |

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for queue recognition by wireless vehicle to vehicle communication, in which an ego vehicle (A), in which the method for queue recognition is performed, receives speed and position values from surrounding vehicles (5.x) situated in the reception area of the vehicle to vehicle communication, the method comprising:
    checking a relevance for surrounding vehicles (5.x) from which the ego vehicle (A) receives messages by a comparison with relevance criteria and establishing a relevance if the relevance criteria are satisfied;
    selecting the speed and position values that are associated with relevant surrounding vehicles (5.x) and have the speed values indicating a direction of travel (3) that is the same as the direction of travel of the ego vehicle (A);
    defining at least one first virtual vehicle (B, C) to which mean values of at least one portion of the, or all, selected speed and position values are allocated as speed and position values for the at least one first virtual vehicle (B, C);
    recording a time profile of the speed and position values of the at least one first virtual vehicle (B, C);
    recording, as at least one change value, the time profile of changes in the speed and position values of the at least one first virtual vehicle (B, C);
    comparing the change value with at least one prescribed queue criterion;
    transmitting, by a communication system of the ego vehicle, a heading of the ego vehicle based on the speed and position values received from the surrounding vehicles;
    ascertaining an acceleration of the at least one first virtual vehicle (B, C) as a change value from two temporally successive associated speed values for the at least one first virtual vehicle (B, C), wherein time offset in the acceleration of the at least one first virtual vehicle (B, C) is taken into account as a change value; and
    providing a warning communication to the driver of the ego vehicle warning the driver that the ego vehicle is entering a hazard region associated with an end of the queue.

2. The method as claimed in claim 1, further comprising recording all the selected speed and position values in a first one of the at least one first virtual vehicle (C).

3. The method as claimed in claim 2, further comprising recording a subselection of the selected speed and position values in a second one of the at least one first virtual vehicle (B) using a prescribed number of the speed and position values in which the position values have the greatest distance (S) to the ego vehicle (A).

4. The method as claimed in claim 1, further comprising determining the distance to the ego vehicle (A) from the position value of the ego vehicle (A) and the position value of a surrounding vehicle and sorting the speed and position values and storing the sorted values in a table according to decreasing or increasing distance from the ego vehicle (A).

5. A method for queue recognition by wireless vehicle to vehicle communication, in which an ego vehicle (A), in which the method for queue recognition is performed, receives speed and position values from surrounding vehicles (5.x) situated in the reception area of the vehicle to vehicle communication, the method comprising:
    checking a relevance for surrounding vehicles (5.x) from which the ego vehicle (A) receives messages by a comparison with relevance criteria and establishing a relevance if the relevance criteria are satisfied;
    selecting the speed and position values that are associated with relevant surrounding vehicles (5.x) and have the speed values indicating a direction of travel (3) that is the same as the direction of travel of the ego vehicle (A);
    defining at least one first virtual vehicle (B, C) to which mean values of at least one portion of the, or all, selected speed and position values are allocated as speed and position values for the at least one first virtual vehicle (B, C);
    recording a time profile of the speed and position values of the at least one first virtual vehicle (B, C);
    recording, as at least one change value, the time profile of changes in the speed and position values of the at least one first virtual vehicle (B, C);
    comparing the change value with at least one prescribed queue criterion;
    transmitting, by a communication system of the ego vehicle, a heading of the ego vehicle based on the speed and position values received from the surrounding vehicles, wherein the sum of the distances ($S_{abc}$) from at least one first virtual vehicle (B, C) to the ego vehicle (A) and/or to a second at least one first virtual vehicle (B, C) is formed as a change value, said change value being taken into account in a queue criterion; and
    providing a warning communication to the driver of the ego vehicle warning the driver that the ego vehicle is entering a hazard region associated with an end of the queue.

6. The method as claimed in claim 1,
    wherein an expected queue end (SE) is estimated for the at least one first virtual vehicle (B, C) as a change value and is taken into account in a queue criterion.

7. The method as claimed in claim 6, wherein a warning distance ($S_{warn}$) for the range of the associated position of the at least one first virtual vehicle (B, C) up to a possible standstill of the at least one first virtual vehicle (B, C) is ascertained from said acceleration, on the assumption that the at least one first virtual vehicle (B, C) with this acceleration brakes to a standstill, and the expected queue end is ascertained from the warning distance and the distance from the ego vehicle (A) to the at least one first virtual vehicle (B, C).

8. A method for queue recognition by wireless vehicle to vehicle communication, in which an ego vehicle (A), in which the method for queue recognition is performed, receives speed and position values from surrounding vehicles (5.x) situated in the reception area of the vehicle to vehicle communication, the method comprising:
  checking a relevance for surrounding vehicles (5.x) from which the ego vehicle (A) receives messages by a comparison with relevance criteria and establishing a relevance if the relevance criteria are satisfied;
  selecting the speed and position values that are associated with relevant surrounding vehicles (5.x) and have the speed values indicating a direction of travel (3) that is the same as the direction of travel of the ego vehicle (A);
  defining at least one first virtual vehicle (B, C) to which mean values of at least one portion of the, or all, selected speed and position values are allocated as speed and position values for the at least one first virtual vehicle (B, C);
  recording a time profile of the speed and position values of the at least one first virtual vehicle (B, C);
  recording, as at least one change value, the time profile of changes in the speed and position values of the at least one first virtual vehicle (B, C);
  comparing the change value with at least one prescribed queue criterion;
  transmitting, by a communication system of the ego vehicle, a heading of the ego vehicle based on the speed and position values received from the surrounding vehicles, wherein an accuracy (G) with which speed and position values for the surrounding vehicles (5.x) are recorded is ascertained and the accuracy (G) is taken into account for the ascertainment of the mean values of the speed and position values that are associated with the at least one first virtual vehicle (B, C); and
  providing a warning communication to the driver of the ego vehicle warning the driver that the ego vehicle is entering a hazard region associated with an end of the queue.

9. An apparatus for queue recognition in an ego vehicle (A) having a communication system, which interchanges information with surrounding vehicles (5.x) in a reception area around the ego vehicle (A) in a wireless vehicle to vehicle communication, wherein the apparatus is configured to perform the method as claimed in claim 1.

* * * * *